United States Patent
Jarutis et al.

(10) Patent No.: US 7,486,433 B2
(45) Date of Patent: Feb. 3, 2009

(54) HIGH-LUMINANCE QUANTUM CORRELATION PHOTON BEAM GENERATOR

(75) Inventors: Vygandas Jarutis, Hokkaido (JP); Vygantas Mizeikis, Hokkaido (JP); Saulius Juodkazis, Hokkaido (JP); Hiroaki Misawa, Hokkaido (JP)

(73) Assignee: Japan Science and Technology Agency, Saitama (JP)

( * ) Notice: Subject to any disclaimer, the term of this patent is extended or adjusted under 35 U.S.C. 154(b) by 0 days.

(21) Appl. No.: 11/664,388

(22) PCT Filed: Sep. 30, 2005

(86) PCT No.: PCT/JP2005/018585
§ 371 (c)(1),
(2), (4) Date: Jul. 23, 2007

(87) PCT Pub. No.: WO2006/038683
PCT Pub. Date: Apr. 13, 2006

(65) Prior Publication Data
US 2008/0049302 A1 Feb. 28, 2008

(30) Foreign Application Priority Data
Oct. 1, 2004 (JP) .............................. 2004-290709

(51) Int. Cl.
*G02F 1/35* (2006.01)
(52) U.S. Cl. .......................... 359/326; 398/152; 372/21
(58) Field of Classification Search ......... 359/326–330; 398/140, 152; 385/122; 372/21, 22
See application file for complete search history.

(56) References Cited

U.S. PATENT DOCUMENTS

| 6,430,345 B1* | 8/2002 | Dultz et al. ................. 385/122 |
| 7,330,653 B1* | 2/2008 | Roberts et al. ................ 398/40 |
| 2008/0037996 A1* | 2/2008 | Spillane et al. ............. 398/152 |

OTHER PUBLICATIONS

Caetano, D.P. and Ribeiro, P.H.S., "Generation of spatial antibunching with free-propagating twin beams", Physical Review A, vol. 68, No. 4, Pt. B, (2003), p. 043806.1-043806.5.

(Continued)

*Primary Examiner*—Hemang Sanghavi
(74) *Attorney, Agent, or Firm*—Wenderoth, Lind & Ponack, L.L.P.

(57) ABSTRACT

A high-luminance quantum correlation photon beam generator in which a laser light source (1) emits a laser pumped light and a parametric crystal (2) generates a pair of two photons of a signal photon and an idler photon on receiving the pumped light to emit two photon beams. Further, a beam splitter (5) splits a signal photon beam (6) from an idler photon beam (7), a mode inverter (10) rotates one of the signal photon beam, (6) and the idler photon beam (7) 180° around its geometric center, a phase adjusting means (8) adjusts phases of the signal photon beam (6) and the idler photon beam (7) based on an optical time delay, and a beam coupling means (14) overlays the signal photon beam (6) with the idler photon beam (7) in a common-line polarized annular shape by the mode inverter (10) to bring them into a quantum correlated state.

9 Claims, 3 Drawing Sheets

OTHER PUBLICATIONS

Kim, Yoon-Ho, "Measurement of one-photon and two-photon wave packets in spontaneous parametric downconversion", Journal of Optical Society of America B, vol. 20, No. 9, (2003), pp. 1959 to 1966.

Jarutis, V. et al., "Ultrabright femtosecond source of biphotons based on a spatial mode inverter", Optics Letters, vol. 30, No. 3, (Feb. 2005), pp. 317 to 319.

Bennett, C. et al., "Quantum Information Theory", IEEE Transactions on Information Theory, vol. 44 No. 6, Oct. 1998, pp. 2724-2742.

Boto, A. et al., "Quantum Interferometric Optical Lithography: Exploiting Entanglement to Beat the Diffraction Limit", The American Physical Society, Sep. 25, 2000, vol. 85, No. 13, pp. 2733-2736.

Fearn, H. et al., "Theory of two-photon interference", Optical Society of America, May 1989, vol. 6, No. 5, pp. 917-927.

Kwiat, P. et al., "New High-Intensity Source of Polarization-Entangled Photon Pairs", The American Physical Society, Dec. 11, 1995, vol. 75, No. 24, pp. 4337-4342.

\* cited by examiner

HIGH-LUMINANCE QUANTUM CORRELATION PHOTON BEAM GENERATOR

TECHNICAL FIELD

The present invention relates to a high-luminance quantum correlation photon beam generator. More specifically, the present invention relates to a high-luminance quantum correlation photon beam generator which can efficiently generate beams formed of a quantum correlated photon pair that are produced from a parametric crystal.

BACKGROUND OF THE INVENTION

In recent years, attention has been focused on quantum information processing such as a quantum cryptography system, quantum teleportation, and a quantum computer, and quantum lithography using the principles of quantum mechanics (for example, C. Bennet and P. Shor, IEEE Trans. Inf. Theory 44, p. 2724 to 2742 (1998), and A. Boto, P. Kok, D. Abrams, S. Braunstein, C. Williams, and J. Dowling, Phys. Rev. Lett. 85 (13), p. 2733-6 (2000)). For these, a quantum correlated photon pair is used which is so called "quantum entanglement." This phenomenon called quantum entanglement is that a single photon (pumped light) of high energy is split into two photons of low energy (a signal photon and an idler photon) to cause these two photons to interfere with each other for correlation.

For a method of generating the quantum correlated photon pair, for example, a method is known in which a parametric crystal (for example, BBO ($\beta$-Ba$_2$B$_2$O$_4$) crystal) that generates and amplifies parametric fluorescence is utilized to launch a pumped light, a pair of two photons of a signal photon and an idler photon is generated at the same time by a spontaneous parametric down-conversion (SPDC) process, and a non-polarizing beam splitter is used to produce a quantum entangled state (H. Fearn and R. Loudon, J. Opt. Soc. Am. B 6, p. 917-927 (1989)).

In other words, for example, when a pumped light ($\omega_p$ is a frequency, and k$_p$ is a wave number (k is a vector)) is launched into a Type II parametric crystal that generates and amplifies parametric fluorescence, a pair of two photons (a signal photon ($\omega_s$, k$_s$) and an idler photon ($\omega_i$, k$_i$)) is generated at the same time which has energy lower than that of the launched pumped light by parametric down-conversion in the parametric crystal. The generated pair of two photons is emitted as a parametric fluorescence pair in an orthogonal polarization state from the parametric crystal at the same time along two non-concentric cones.

As shown in FIG. 1(a), a phase matched parametric fluorescence pair exists only at a position of point symmetry to beams of pumped light (in the drawing, a black dot located between rings) (k$_s$ and k$_i$). Then, only those satisfying the following phase conditions are cut out by a pin hole among the fluorescence pairs, lead to a non-polarizing beam splitter, and then caused to interfere with each other to form a quantum correlated photon pair with entangled paths.

$$\omega_p = \omega_s + \omega_i$$

$$k_p = k_s + k_i$$

(Where subscripts p, s, and i indicate a pumped photon, a signal photon, and an idler photon, respectively.)

DISCLOSURE OF THE INVENTION

However, in the conventional method of generating quantum correlated photon pairs, among signal photons and idler photons in an annular shape in the plane vertical in the emitting direction, only those in phase matching are cut out by a pin hole and used to form quantum correlated photon pairs. Since the remaining ones could not be used, the efficiency of generating quantum correlated photon pairs is not enough. In utilizing the quantum correlated photon pair for quantum information processing and quantum lithography, it was necessary to further improve the efficiency of generating quantum correlated photon pairs in order to shift from a laboratory stage toward a practical use stage.

Then, the present invention has been accomplished in view of the above circumstances. It is an object of the present invention to provide a high-luminance quantum correlation photon beam generator which can solve the problem of the conventional technique and can further improve the efficiency of generating quantum correlated photon pairs obtained from a parametric crystal.

According to the present invention, in order to solve the problem above, first, a high-luminance quantum correlation photon beam generator for forming a photon beam of a quantum correlated pair is provided, which is characterized by including: a laser light source operable to emit a laser pumped light; a parametric crystal operable to generate a pair of two photons of a signal photon and an idler photon on receiving the pumped light from the laser light source to emit two photon beams along two non-concentric cones; a beam splitting means operable to split a signal photon beam from an idler photon beam; a mode inverter operable to rotate one of the annular signal photon beam and the idler photon beam 180° around its geometric center; a phase adjusting means operable to adjust phases of the signal photon beam and the idler photon beam based on an optical time delay; and a beam coupling means operable to overlay the signal photon beam with the idler photon beam in a common-line polarized annular shape by the mode inverter to bring them into a quantum correlated state.

In addition, secondly, in the first invention, a high-luminance quantum correlation photon beam generator is provided, wherein an interference filter is arranged on an emission side of the beam coupling means.

In addition, thirdly, in the first or second invention, a high-luminance quantum correlation photon beam generator is provided, which is characterized in that the laser light source is a femto second laser light source that emits a pulse laser light having a pulse width of femto second.

In addition, fourthly, in any one of the first to third inventions, a high-luminance quantum correlation photon beam generator is provided, which is characterized in that the beam splitting means is a polarizing beam splitter.

In addition, fifthly, in any one of the first to fourth inventions, a high-luminance quantum correlation photon beam generator is provided, which is characterized in that the mode inverter is configured of a combination of two mirrors and a single prism.

In addition, sixthly, in any one of the first to fifth inventions, a high-luminance quantum correlation photon beam generator is provided, which is characterized in that the beam coupling means is a non-polarizing beam splitter.

In addition, seventhly, in any one of the first to sixth inventions, a high-luminance quantum correlation photon beam generator is provided, which is characterized in that the parametric crystal is a Type I parametric down-conversion crystal.

In addition, eighthly, in any one of the first to sixth inventions, a high-luminance quantum correlation photon beam generator is provided, which is characterized in that the parametric crystal is a Type II parametric down-conversion crystal.

Moreover, ninthly, in the seventh or eighth invention, a high-luminance quantum correlation photon beam generator is provided, which is characterized in that the parametric crystal is a BBO (β-Ba$_2$B$_2$O$_4$) crystal.

According to the invention of this application, all of the annular parametric fluorescence pairs can be quantum correlated without cutting out a part of the annular parametric fluorescence pairs emitted from the parametric crystal by a pin hole for quantum correlation. Accordingly, the efficiency of generating quantum correlated photon pairs obtained from a parametric crystal can be improved dramatically.

DETAILED DESCRIPTION OF THE INVENTION

The present invention is characterized as described above, and an embodiment will be described below.

In a high-luminance quantum correlation photon beam generator according to the present invention, it is greatly characterized by including a laser light source operable to emit a laser pumped light; a parametric crystal operable to generate a pair of two photons of a signal photon and an idler photon on receiving the pumped light from the laser light source to emit two photon beams along two non-concentric cones; a beam splitting means operable to split a signal photon beam from an idler photon beam; a mode inverter operable to rotate one of the annular signal photon beam and the idler photon beam 180° around its geometric center; a phase adjusting means operable to adjust phases of the signal photon beam and the idler photon beam based on an optical time delay; and a beam coupling means operable to overlay the signal photon beam with the idler photon beam in a common-line polarized annular shape by the mode inverter to bring them into a quantum correlated state, wherein a photon beam of a quantum correlated pair is formed.

In the present invention, for a parametric crystal, a Type I parametric down-conversion crystal in which the polarized states of a signal photon and an idler photon are the same, and a Type II parametric down-conversion crystal in which the polarized states are orthogonal can be used.

Figure 1:
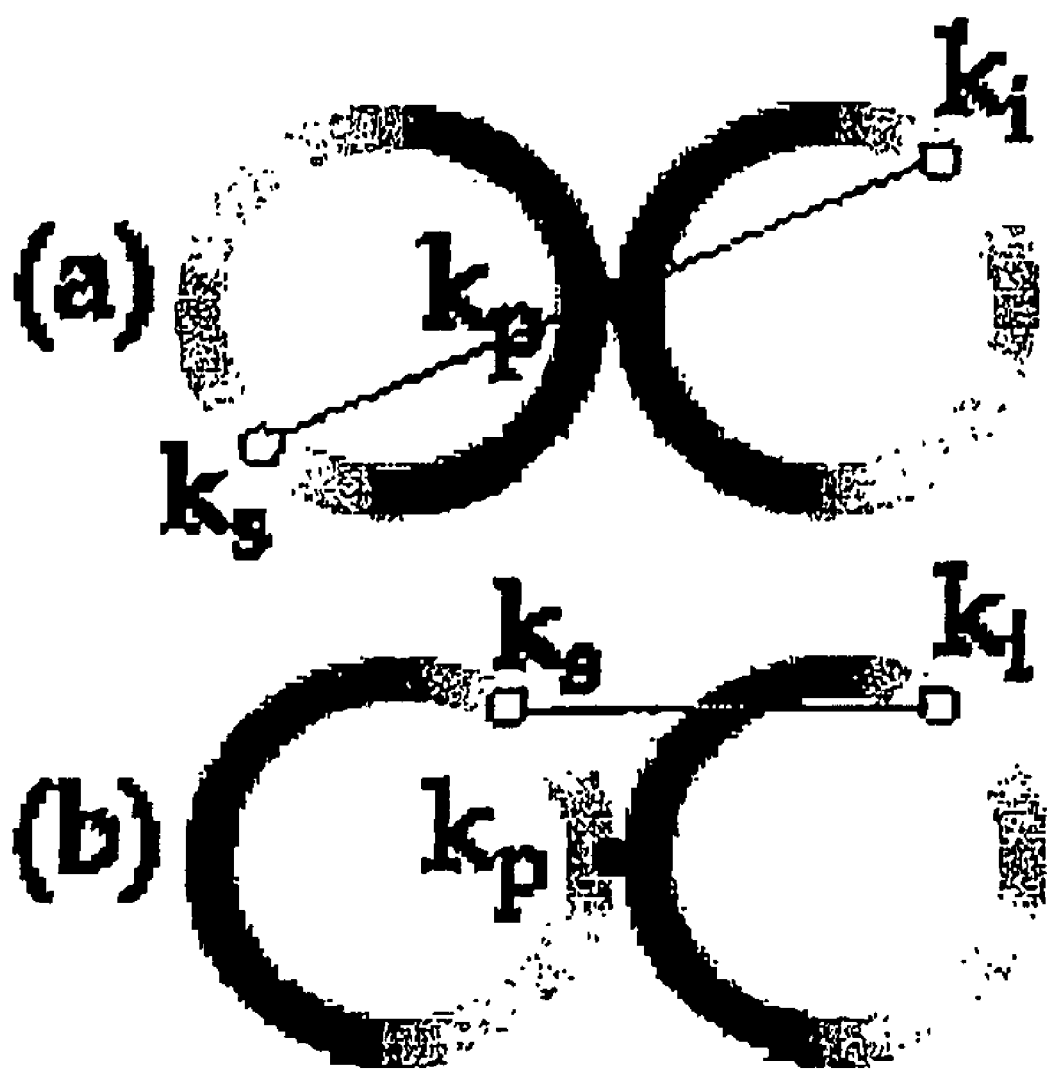
FIG. 1(a) shows a diagram depicting the relation of the positions and the relation of wave number vectors between the ring of a signal light beam and the ring of an idler light beam in the direction of pumped light.
FIG. 1(b) shows a diagram similar to FIG. 1(a) after mode conversion according to the present invention.

The following identifies the basic technical concepts of this application. For example, the ring of a signal photon beam and the ring of an idler photon beam that are emitted from a Type II parametric down-conversion crystal have the relation shown in FIG. 1 (a), and it was difficult to overlay the rings with each other as they are phase matched, but the spatial positions are mode inverted into the state in which the rings can be overlaid as phase matched throughout the area as shown in FIG. 1(b), and an optical time delay is utilized to cause the rings to interfere with each other for a quantum entangled state.

Hereinafter, the case of using a BBO crystal that is a Type II parametric down-conversion crystal is taken as an example for detailed description.

FIG. 2(a) shows a diagram schematically depicting an embodiment of the high-luminance quantum correlation photon beam generator according to the present invention, and FIG. 2(b) shows a conceptual diagram depicting a mode inverter.

A laser light source (1) emits a pumped light, which may be one that emits a pulse laser light, or one that emits a continuous wave (CW) laser light. For example, a Ti:sapphire laser apparatus that emits a pulse laser light, a Ti:sapphire laser apparatus that emits a continuous wave laser light, and an argon ion laser apparatus can be used, but the apparatus is not limited thereto. In the embodiment, a Ti:sapphire laser apparatus that emits a pulse laser light was used.

For a parametric crystal, a BBO crystal (2) that is a Type II parametric down-conversion crystal is used here. The BBO crystal (2) receives a pumped light of high energy to generate a pair of two photons of a signal photon and an idler photon of low energy in an orthogonal polarization state, and emits two photon beams along two non-concentric cones. The photon beams are formed in an annular shape in the direction vertical to the direction of the photon beams, and the size can be controlled by the incident angle of the pumped laser light.

A dichroic mirror M1 (3) is a mirror that utilizes a dielectric film, which serves to pass the signal photon beam and the idler photon beam and to remove the pumped light 100%. A lens (4) is a collimating lens, which collimates two beams of the signal photon and the idler photon conically spreading into collimated beams. A polarizing beam splitter PBS (5) passes the signal light beam (6) and reflects the idler light beam (7).

A prism (8) is moved in the direction of an arrow X to adjust spatial positions and moved in the direction of an arrow τ to adjust an optical time delay τ. When the optical time delay τ changes by moving in the arrow X, the delay is adjusted again. An optical mirror M2 (9) serves to change the direction so that the idler light beam (7) from the prism (8) is directed to a non-polarizing beam splitter NPBS (14).

A mode inverter (10) serves to rotate the annular signal light beam (6) 180° around its geometric center, which is formed of two plane mirrors (10-1, 10-2) and a single prism (10-3). In FIG. 2(b), for explaining an image of mode inversion, numerals are assigned at the corners of a pentagon. When such a pentagon passes through the mode inverter (10), it is turned into a pentagon that is rotated (upside down) 180° around the geometric center shown at the output side.

A prism (11) and a mirror M3 (12) serve to change the direction so that the signal light beam (6) from the mode inverter (10) is directed to a non-polarizing beam splitter NPBS (14) in which the optical path lengths of the signal light beam (6) and the idler light beam (7) are made equal for easy optical adjustment. A λ/2wave plate (13) is arranged to make the polarization mode of the signal light beam (6) the same as the idler light beam (7).

The non-polarizing beam splitter NPBS (14) is a 50/50 beam splitter, which passes 50% of the signal light beam (6) and 50% of the idler light beam (7), reflects the remaining 50%, and causes the two beams (6) and (7) to interfere with each other for a quantum entangled state, that is, a quantum correlated state.

Interference filters (15) and (16) are arranged to efficiently take the quantum correlated photon beams, which remove the pumped light when mixed.

In addition, photodiodes D1 (17) and D2 (18) and a coincidence counter (19) are arranged to confirm the efficiency of generating quantum correlated photon pairs.

Next, the operation of the high-luminance quantum correlation photon beam generator in the configuration above will be described.

First, a pulse pumped light is emitted from the laser light source (1), and launched into the BBO crystal (2). The launched pumped photon generates a pair of two photons (parametric fluorescence pair) of a signal photon and an idler photon in the orthogonal polarization state in the BBO crystal (2) by the Type II parametric down-conversion process. The signal photon and the idler photon are emitted in an annular shape from the BBO crystal (3) along two non-concentric cones. These two beams of the signal photon and the idler photon pass through the lens M1 (3), formed into collimated beams by the lens L1 (4), and launched into the polarizing beam splitter PBS (5). In the polarizing beam splitter (5), the signal photon beam (6) passes therethrough as unchanged, and the idler photon beam (7) is reflected.

The idler photon beam (7) passes through the prism (8) to reflect at the mirror M2 (9), and is launched into the non-polarizing beam splitter NPBS (14).

On the other hand, the mode inverter (10) inverts the annular spatial geometric form of the signal photon beam (6) in the state in which it is just rotated 180° around its geometric center. Then, the direction of the signal photon beam (6) geometrically inverted is changed by the prism (11) and the mirror M3 (12), converted into the same polarization mode as that of the idler light beam (7) by the λ/2 wave plate (13), and launched into the non-polarizing beam splitter NPBS (14).

In the non-polarizing beam splitter NPBS (14), 50% of the signal light beam (6) passes therethrough as unchanged, the remaining 50% is reflected, 50% of the idler light beam (7) passes therethrough as unchanged, and the remaining 50% is reflected. Then, 50% of the passed signal light beam (6) is overlaid with 50% of the reflected idler light beam (7) as well as 50% of the reflected signal light beam (6) is overlaid with 50% of the passed idler light beam (7), they are matched spatially and temporarily to interfere with each other into a quantum entangled state, and are outputted as the beams of a quantum correlated photon pair. At this time, two photons that make the quantum correlated photon pair are paired and emitted on the D1 (17) side or D2 (18) side.

Figure 3:
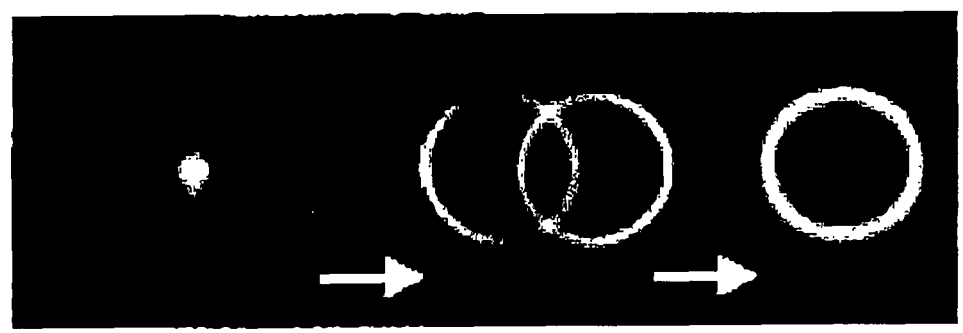
FIG. 3(a) shows a diagram depicting a manner of changing states in which the ring of the signal light beam and the ring of the idler light beam are separated from each other, partially overlapped, and fully overlaid.
FIG. 3(b) shows a diagram depicting the relation between a CC rate and an optical time delay τ in the rightmost state in which the rings are fully overlaid.
Figure 3:
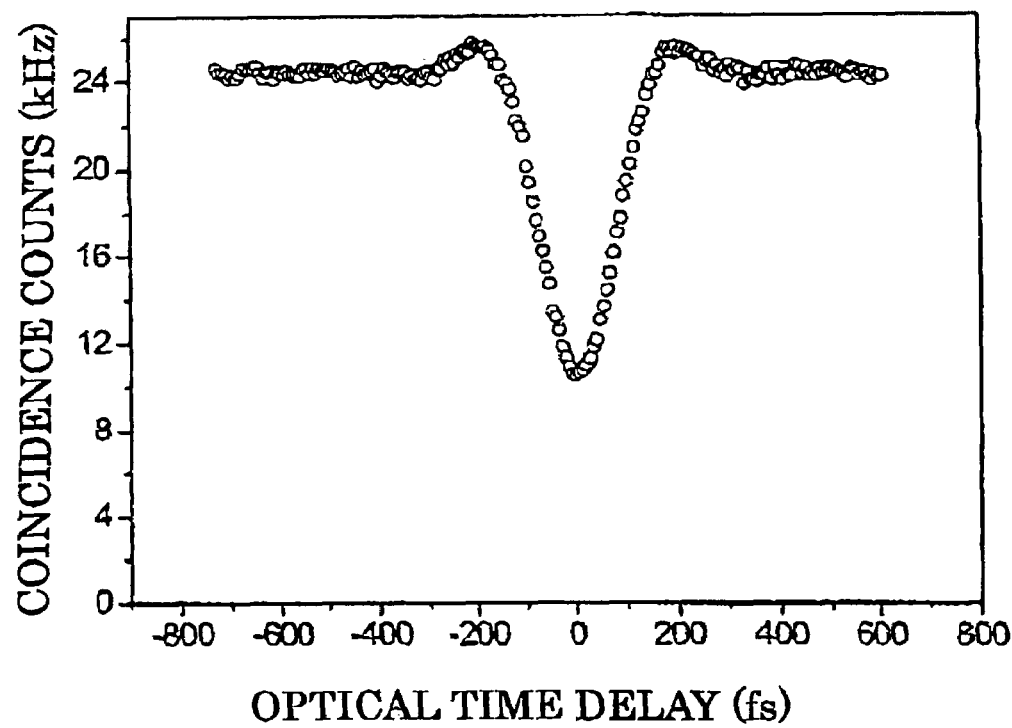

In the non-polarizing beam splitter NPBS (14), the prism (8) is moved in the X-direction to overlay the spatial positions of the rings of the signal light beam (6) and the idler light beam (7) as shown in FIG. 3(a). In addition, the optical time delay τ is also adjusted by moving the prism (8).

As described above, in the non-polarizing beam splitter NPBS (14), the ring of the signal light beam (6) is overlaid with the ring of the idler light beam (7) throughout the area to form a quantum entangled state, whereby the efficiency of generating quantum correlated photon pairs can be improved dramatically.

Next, an example of the present invention will be described. Of course, it is without saying that the invention is not restricted to the embodiment above and the example below, and various modifications may be contemplated for the details.

EXAMPLE

Figure 2:
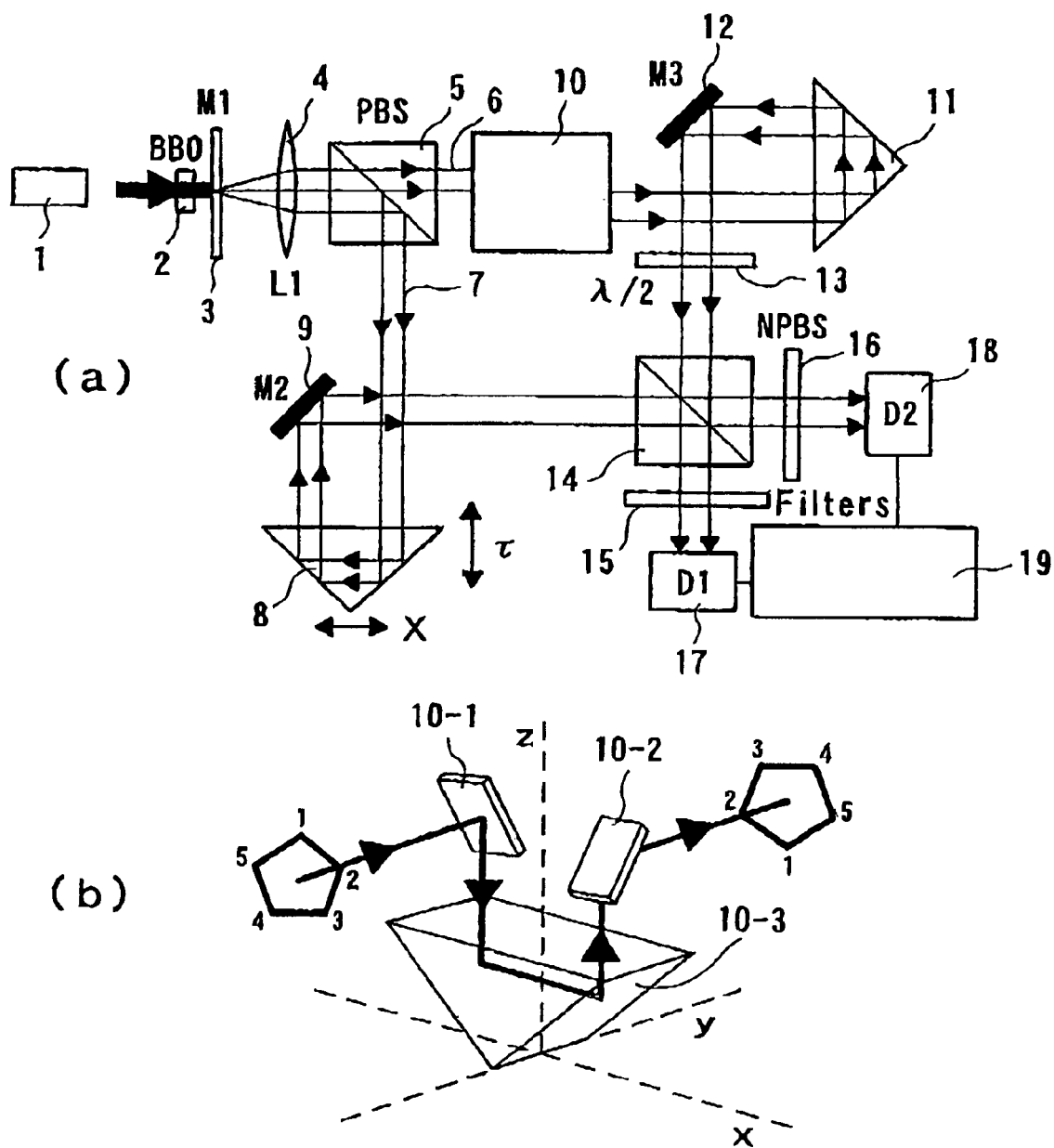
FIG. 2(a) shows a diagram depicting an embodiment of a high-luminance quantum correlated photon beam generator according to the present invention including a test system for the efficiency of generation.
FIG. 2(b) shows a perspective view schematically depicting a mode inverter in the embodiment.

An apparatus in the configuration shown in FIG. 2 was used to generate quantum correlated photon beams. For a laser apparatus (1), a Ti:sapphire laser apparatus emitting pulse laser light was used (Tsunami, manufactured by Spectra Physics, Inc., where a pulse length was 100 fs, a center frequency was 800 nm, and a repetition frequency was 80 MHz). For the BBO crystal (2), a Type II parametric down-conversion crystal having a thickness of 0.5 mm was used. The relative phase between the signal light beam (6) and the idler light beam (7) was changed by adjusting the position of the prism (8) to control an optical time delay τ. The generated quantum correlated photon pairs were received by the photodiode D1 (17) and D2 (18) (SPCM-AQR-14, manufactured by Perkin Elmer Corp.) through the interference filters (15) and (16) having a band width of 10 nm (FWHM), and counted by the coincidence counter (19) (single photon counter (SR400, manufactured by Stanford Research Systems, Inc.)). The coincidence counter (19) used was one that performs coincident counts (hereinafter, also referred to as CC) within a time window of 5 ns. For example, the coincidence counter (19) is a unit that makes counts when a photon reaches and detected by D1 and another photon is detected by D2 within a certain time period (up to about 10 ns) (in this case, D1 is started and then D2 is a stop button, and vise versa). When the optical time delay τ is zero, quantum correlated photon pairs are most efficiently generated, and two photons are emitted only on the D1 side or the D2 side. Thus, since the coincidence counter (19) is started but not stopped, no counts are made and the value of CC is decreased.

The efficiency of generating quantum correlated photon pairs according to the apparatus of the example configured above is 42%, which was efficient at least 100 times or greater than a conventional Type II BBO-based apparatus (Y. H. Kim, Phys. Rev. A 68, 13, p. 804 (2003)) and was efficient at least 30 times or greater than a conventional Type I BBO-based apparatus (Y. H. Kim, J. Opt. Soc. Am. B 20, p. 1959-1966 (2003)). The photon flux obtained is estimated as $1.7 \times 10^6$ photons/s. In addition, the apparatus of the example had the performance that cleared a standard Hong-Ou-Mandel test that takes the CC rate as a function of τ for analysis (C. K. Hong, Z. Y. Ou, and L. Mandel, Phys. ReV. Lett. 59, p. 2044-2046 (1987)).

In addition, FIG. 3(b) shows the relation between a CC rate and an optical time delay τ studied by the apparatus of the example. From this drawing, a CC rate of 24 kHz is observed with respect to an optical time delay τ (>200 fs) that exceeds the reciprocal of the band width of the interference filters (15) and (16). When the ring of the signal photon beam (6) was not overlaid with the ring of the idler photon beam (7), a dip shown in FIG. 3(b) was not detected. The dip of the CC rate observed when the optical time delay τ was zero was a confirmation of formation of a quantum correlated photon pair. The detected rate of two photons in total exceeded 16 kHz (it was equal to the maximum value of the CC dip depth).

As described above, the superiority of the apparatus of the example was confirmed.

The invention claimed is:

1. A high-luminance quantum correlation photon beam generator for forming photon beams delivering a plurality of quantum-correlated photon pairs, the high-luminance quantum correlation photon beam generator comprising:

a laser light source operable to emit a laser light to be used as an optical pump;

a non-linear crystal operable to receive the laser light to be used as the optical pump emitted from the laser light source and generate, from the received laser light to be used as the optical pump, a pair of photons including a signal photon and an idler photon, the signal photon and the idler photon being emitted into a pair of annular non-concentric hollow-cone beams as a signal photon beam and an idler photon beam, respectively;

beam splitting means operable to split the signal photon beam from the idler photon beam;

a mode inverter operable to rotate one of the signal photon beam and the idler photon beam 180° around a geometric center thereof;

phase adjusting means operable to adjust phases of another of the signal photon beam and the idler photon beam based on an optical time delay; and beam coupling means operable to overlay the signal photon beam with the idler photon beam received by the beam coupling means in a common annular shape to bring the overlayed signal photon beam and idler photon beam into a quantum correlated state.

2. The high-luminance quantum correlation photon beam generator according to claim 1, wherein an interference filter is arranged on an emission side of the beam coupling means.

3. The high-luminance quantum correlation photon beam generator according to claim 1, wherein the laser light source is a femto second laser light source that emits a pulse laser light having a pulse width of femto second.

4. The high-luminance quantum correlation photon beam generator according to claim 1, wherein the beam splitting means spatially separates directions of propagation of idler and signal photon beams according to a down-conversion process.

5. The high-luminance quantum correlation photon beam generator according to claim 1, wherein the mode inverter comprises a combination of two mirrors and a single prism.

6. The high-luminance quantum correlation photon beam generator according to claim 1, wherein the beam coupling means is a non-polarizing beam splitter.

7. The high-luminance quantum correlation photon beam generator according to claim 1, wherein the non-linear crystal is a Type I parametric down-conversion crystal.

8. The high-luminance quantum correlation photon beam generator according to claim 1, wherein the non-linear crystal is a Type II parametric down-conversion crystal.

9. The high-luminance quantum correlation photon beam generator according to claim 7, wherein the non-linear crystal is a BBO ($\beta$-$Ba_2B_2O_4$) crystal.

* * * * *